United States Patent Office.

MARTIN C. OLSON, OF CHICAGO, ILLINOIS.

INK-ERASING COMPOSITION.

SPECIFICATION forming part of Letters Patent No. 684,710, dated October 15, 1901.

Application filed February 23, 1901. Serial No. 48,449. (No specimens.)

*To all whom it may concern:*

Be it known that I, MARTIN C. OLSON, a citizen of the United States, residing at Chicago, in the county of Cook and State of Illinois, have invented a new Ink-Erasing Composition, of which the following is a specification.

The object of the present invention is to provide a new composition of matter which may be molded into sticks, pencils, cakes, or other desired form and used for the purpose of erasing ink and similar marks from paper. My aim has been to provide for this purpose a composition of such nature that when molded it will have sufficient strength and durability to permit of its being handled as any ordinary eraser or desk implement is handled without being broken and at the same time having such a consistency that it will easily and quickly erase marks from the paper, while leaving a smooth surface. To these ends I have combined, in substantially the proportions named, powdered pumice, two parts; boiled glue, two parts; the white of egg, one part, and boiled sugar, one part. In my experiment giving the best results I used and combined in the manner hereinafter described two tablespoonfuls of powdered pumice, two tablespoonfuls of boiled glue, the white of one egg, and one tablespoonful of boiled sugar. I desire to have it understood, however, that these proportions may be varied without departing from the spirit of my invention, and in fact should be varied and will be varied somewhat for the purpose of changing the consistency of the completed article.

In assembling the ingredients I prefer to thoroughly mix the white of egg and powdered pumice before the other ingredients are added. The boiled glue and boiled sugar may be added to each other and thoroughly mixed before being added to the other ingredients or may be added separately. The glue and sugar are added while still in a fluid state, and when the whole mass is thoroughly mixed it is poured into molds of the desired shape and allowed to cool and harden.

In the finished article the powdered pumice forms the abradant. The glue and sugar form the bond for holding the mass together. The glue will do this without the sugar; but in practice I find that when glue alone is used the mass is too hard for some purposes, although it is suitable and available for other purposes. The sugar also will serve as a bond and might be used without the glue; but in practice I find that when sugar alone is used the mass is too soft and brittle. I prefer, therefore, to use the glue and sugar together, since the latter acts as a mollifier of the former.

The purpose of the white of egg is to increase the porosity of the mass and prevent the particles of pumice from being too firmly bound together. My theory of this is that when the white of egg is first mixed with the pumice each of the many particles of pumice will be coated and to an extent protected from immediate contact with the binding substance, so that the binding substance being brittle will break away and allow the particles of pumice to be exposed for contact with the paper.

What I claim as new, and desire to secure by Letters Patent, is—

1. A new composition of matter containing powdered pumice and the white of egg in substantially the proportions specified, and a binding substance.

2. A new composition of matter containing powdered pumice, the white of egg and glue in substantially the proportions specified.

3. A new composition of matter consisting of powdered pumice, boiled glue, the white of egg and boiled sugar in substantially the proportions specified.

MARTIN C. OLSON.

Witnesses:
L. M. HOPKINS,
BERTHA C. SIMS.